US012411434B2

(12) United States Patent
Obara

(10) Patent No.: US 12,411,434 B2
(45) Date of Patent: Sep. 9, 2025

(54) IMAGE FORMING APPARATUS CONFIGURED TO FORM LATENT IMAGE FOR ADHESION PROCESSING

(71) Applicant: CANON KABUSHIKI KAISHA, Tokyo (JP)

(72) Inventor: Mitsuhiro Obara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/659,211

(22) Filed: May 9, 2024

(65) Prior Publication Data

US 2024/0385550 A1 Nov. 21, 2024

(30) Foreign Application Priority Data

May 15, 2023 (JP) ................................ 2023-080365

(51) Int. Cl.

*G03G 15/04* (2006.01)
*G03G 15/00* (2006.01)
*G03G 15/043* (2006.01)
*G03G 15/20* (2006.01)

(52) U.S. Cl.

CPC ....... *G03G 15/043* (2013.01); *G03G 15/2064* (2013.01); *G03G 15/6544* (2013.01); *G03G 2215/00835* (2013.01)

(58) Field of Classification Search

USPC ........................................................... 399/51
See application file for complete search history.

(56) References Cited

U.S. PATENT DOCUMENTS

2014/0227064 A1* 8/2014 Matsue ................. B42C 13/003 412/37
2015/0362880 A1* 12/2015 Abe ................... G03G 15/6541 399/408

FOREIGN PATENT DOCUMENTS

JP 2004209858 A 7/2004
JP 2005162352 A 6/2005
JP 2013043751 A * 3/2013 ......... G03G 15/6544

* cited by examiner

*Primary Examiner* — Quana Grainger
(74) *Attorney, Agent, or Firm* — ROSSI, KIMMS & McDOWELL LLP

(57) ABSTRACT

An image forming apparatus includes: a scanning unit configured to form latent images in a first region and in a second region of the photoreceptor; and a control unit configured to control a light emission luminance of the scanning unit. The control unit is further configured to set the light emission luminance of the scanning unit to a first light emission luminance when scanning of the first region is started, and set the light emission luminance of the scanning unit to a second light emission luminance higher than the first light emission luminance when scanning of the second region is started, and to decrease the light emission luminance of the scanning unit while the second region is being scanned, in a case where the second region is an upstream side of the first region in the scanning direction.

12 Claims, 11 Drawing Sheets

IMAGE FORMING APPARATUS CONFIGURED TO FORM LATENT IMAGE FOR ADHESION PROCESSING

BACKGROUND OF THE INVENTION

Field of the Invention

The present invention relates to an image forming apparatus configured to form an image on a sheet and perform adhesion processing on a plurality of sheets each having an image formed thereon.

Description of the Related Art

An electrographic type image forming apparatus forms a latent image on a photoreceptor by scanning and exposing the photoreceptor by light emitted from a scanning apparatus, and forms an image on the photoreceptor by developing the latent image with toner. The image forming apparatus then forms an image on a sheet by transferring the image formed on the photoreceptor to a sheet directly or via an intermediate transfer member. An image forming apparatus, which includes a post-processing apparatus that performs binding processing or the like on a plurality of sheets each having an image formed thereon, is used. Generally, the binding processing is performed by an electric stapler using metal staples. In order to recycle the plurality of sheets subjected to the binding processing using metal staples, it is necessary to remove the metal staples. Therefore, an image forming apparatus configured to perform adhesion processing by making an adhesive adhere to a plurality of sheets is proposed.

Japanese Patent Laid-Open No. 2004-209858 discloses a configuration that uses toner as an adhesive. Specifically, in Japanese Patent Laid-Open No. 2004-209858, it is disclosed that a latent image for an image based on image data received from a user by a print job (referred to as user latent image in the following) and a latent image for adhesion (referred to as adhesion latent image) are formed on a photoreceptor, and the user latent image is developed based on the image data, and the adhesion latent image is developed with toner of large remaining amount. The plurality of sheets is adhered by toner adhering to the adhesion latent image. In addition, Japanese Patent Laid-Open No. 2005-162352 discloses that the amount of applied toner adhered to the adhesion latent image is increased, in order to secure the adhesion force.

In order to increase the amount of applied toner, it is necessary to increase the exposure amount of the photoreceptor, i.e., the light emission luminance (light emission intensity) of the scanning apparatus. On the other hand, the light emission luminance of the scanning apparatus for forming the user latent image is determined in accordance with image forming condition. Therefore, in order to increase the adhesion force, it is necessary to set the light emission luminance of the scanning apparatus, in the image region in which the user latent image is formed, to a first light emission luminance determined by the image forming condition, and to set the light emission luminance of the scanning apparatus, in the adhesion region in which the adhesion latent image is formed, to a second light emission luminance which is higher than the first light emission luminance.

However, the light emission efficiency of semiconductor laser used as the light source in the scanning apparatus generally decreases as the temperature of the element rises. When the light emission luminance of the scanning apparatus in the adhesion region is increased in order to secure the adhesion force, a light emission efficiency of the light source may be decreased. In such a state, if the light emission luminance of the scanning apparatus is switched to the first light emission luminance in order to scan the image region, the light emission luminance of the scanning apparatus may become a third light emission luminance which is lower than the first light emission luminance that is required for the image region scanning, due to decreased light emission efficiency. The density of an image formed with the third light emission luminance that is lower than the first light emission luminance is lower than the target density. This decrease in the density continues until the temperature of the light source decreases to a temperature at which the light emission efficiency is recovered. In such a case, therefore, density unevenness may occur in the image formed in the image region.

SUMMARY OF THE INVENTION

According to as aspect of the present invention, an image forming apparatus configured to form an image on a sheet, includes: a scanning unit configured to, by scanning a photoreceptor with light in a scanning direction, form a first latent image based on image data in a first region of the photoreceptor, and form, in a second region of the photoreceptor which is different from the first region in the scanning direction, a second latent image for adhesion processing for the sheet; a developing unit configured to develop the first latent image and the second latent image with toner; and a control unit configured to control a light emission luminance of the scanning unit; wherein the control unit is further configured to set the light emission luminance of the scanning unit to a first light emission luminance when scanning of the first region is started, and set the light emission luminance of the scanning unit to a second light emission luminance which is higher than the first light emission luminance when scanning of the second region is started, and the control unit is further configured to decrease the light emission luminance of the scanning unit from the second light emission luminance while the second region is being scanned, in a case where the second region is located at an upstream side of the first region in the scanning direction.

Further features of the present invention will become apparent from the following description of exemplary embodiments with reference to the attached drawings.

DESCRIPTION OF THE EMBODIMENTS

Figure 1:
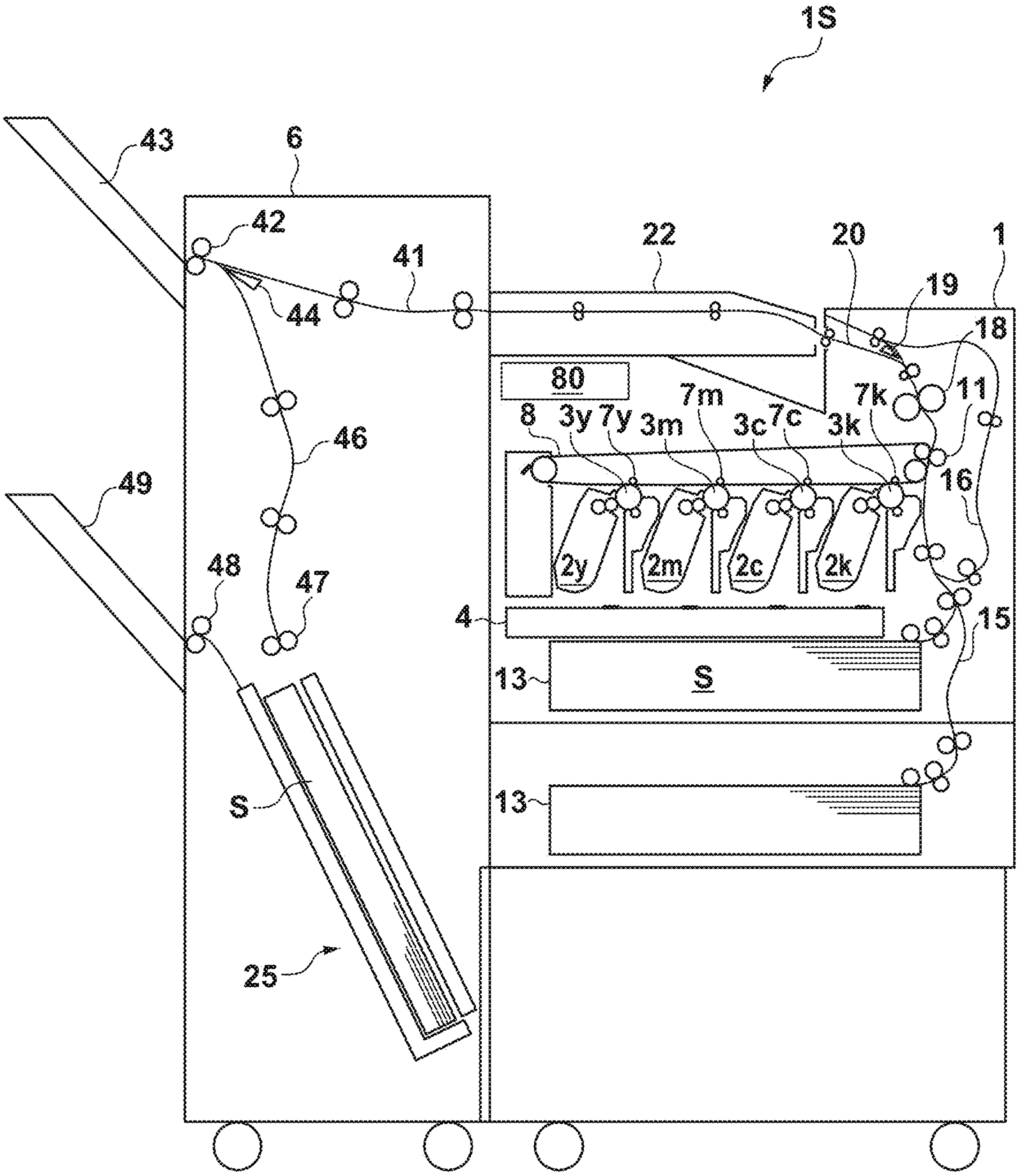
FIG. 1 is a schematic configuration diagram of an image forming apparatus, according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An image forming apparatus described in each of the following embodiments forms an image on a sheet using toners of yellow, magenta, cyan and black. The sheet may include paper such as plain paper or thick paper, plastic film, cloth, and a sheet material such as coated paper that is subjected to surface treatment, or the like. The image forming apparatus uses, as an adhesive, a toner of at least one color among toners of a plurality of colors used for image formation. The color of the toner to be applied as the adhesive may be used in a fixed manner. Alternatively, the color of the toner to be used as the adhesive may be dynamically selected based on the remaining amount of each toner, or the like. When the color of the toner applied as the adhesive is used in a fixed manner, the toner having an adhesion function must be used as the toner of this color. However, for the toner of a color not to be used as an adhesive, the toner not having an adhesion function can be used. Alternatively, when the color of the toner applied as the adhesive is dynamically selected, the toner having an adhesion function is used for all the colors. In the following description, it is assumed that the image forming apparatus uses a toner of black as the adhesive in a fixed manner. Therefore, at least a toner of black has an adhesion function.

First Embodiment

FIG. 1 is a schematic configuration diagram of an image forming apparatus 1S according to the present embodiment. In the following drawings, characters y, m, c, and k provided at the end of reference numerals indicate that each of the toner colors used for image formation by the members indicated by the reference numerals are respectively yellow, magenta, cyan, and black. Note that, when it is not necessary to distinguish colors, the reference numeral in which the character at the end is omitted will be used.

An image forming apparatus 1S includes a main body apparatus 1 and a post-processing apparatus 6. The main body apparatus 1 includes a control unit 80 configured to control the image forming apparatus 1S as a whole. The control unit 80 includes one or more processors and one or more memory devices. The one or more memory devices include volatile memories and non-volatile memories. The one or more processors execute a computer program stored in the one or more memory devices to control the image forming apparatus 1S. The control unit 80 may further include a hardware such as an ASIC that executes a part of the processing to be performed by the image forming apparatus 1S. The control unit 80 is also configured to communicate with an external apparatus (not illustrated) via a network. The control unit 80 forms an image on a sheet S based on image data received by a print job input to the image forming apparatus 1S from a user via an external apparatus.

In the following description, an image to be formed on the sheet S based on the image data received by a print job will be referred to as "user image". In addition, when performing adhesion processing of the sheet S, the main body apparatus 1 forms an image for adhesion on the sheet S with a toner of black to be used as the adhesive. In the following description, the image for adhesion will be referred to as "adhesion image". Here, the adhesion image and the user image will be simply referred to as "image" when they are not required to be distinguished from each other. The post-processing apparatus 6 performs the adhesion processing on a plurality of sheets S on which images are formed by the main body apparatus 1 based on the print job.

In image formation, a photoreceptor 3 of the main body apparatus 1 is rotationally driven in a clockwise direction with respect to the drawing, and charged to a predetermined voltage by a charge roller. A scanning apparatus 4 scans and exposes each of the photoreceptors 3 with light to form a latent image thereon. In the following description, a latent image formed on each of the photoreceptors 3 for the user image is referred to as "user latent image", and a latent image formed on each of the photoreceptors 3 for the adhesion image is referred to as "adhesion latent image". In addition, the user latent image and the adhesion latent image are simply referred to as "latent image" when they are not required to be distinguished from each other. When the adhesion processing is not performed, only the user latent image is formed on each photoreceptor 3. When, on the other hand, the adhesion processing is performed, an adhesion latent image is further formed on a photoreceptor 3*k*. Each developing unit 2 includes a toner of a corresponding color, and forms an image on the photoreceptor 3 by developing the latent image on the corresponding photoreceptor 3 with the toner. The image formed on the photoreceptor 3 is transferred to an intermediate transfer member 8 by a primary transfer roller 7. Here, by transferring the images formed on each of the photoreceptors 3 to the intermediate transfer member 8 in an overlapping manner, it is possible to represent a different color from the color of the toner used for image formation. In image formation, the intermediate transfer member 8 is rotationally driven in a counterclockwise direction with respect to the drawing. Accordingly, the image transferred to the intermediate transfer member 8 is conveyed to a position facing a secondary transfer roller 11.

The secondary transfer roller 11 transfers the image on the intermediate transfer member 8 to the sheet S fed to a main conveyance path 15 from a cassette 13 and conveyed along the main conveyance path 15. Each conveyance path of the image forming apparatus 1S including the main conveyance path 15 is provided with a roller configured to convey the sheet S. A fixing apparatus 18 applies heat and pressure to the sheet S to fix the image on the sheet. In a case where an image is formed only on one side of the sheet, after the image is fixed, the sheet S is conveyed to the post-processing apparatus 6 via a relay conveyance unit 22. At this time, a flapper 19 is set in a direction for guiding the sheet S to a relay conveyance path 20. On the other hand, in a case where images are formed on both sides of the sheet, after an image transferred to one side is fixed, the sheet S is guided to a double-sided conveyance path 16 by the flapper 19. After the sheet S is guided to the double-sided conveyance path 16, the conveyance direction of the sheet S is reversed. And thus, the sheet S is conveyed to the main conveyance path 15 again, and image formation is performed on the other side. The sheet S having images formed on both sides is conveyed to the post-processing apparatus 6 via the relay conveyance unit 22.

The sheet S conveyed to the post-processing apparatus 6 is conveyed along a first conveyance path 41. When the adhesion processing (binding processing) of the sheet S is not performed, the sheet S is discharged to a discharge tray 43 by a discharge roller 42. When the adhesion processing is performed, the sheet S is conveyed to a second conveyance path 46 by rotating the discharge roller 42 in a direction opposite to the direction before then. At this time, the flapper 44 is set in a direction for guiding the sheet S to the second conveyance path 46. The sheet S conveyed to the second conveyance path 46 is then conveyed to the processing apparatus 25 by a conveyance roller 47. The processing apparatus 25 stacks the sheets S conveyed from the second conveyance path 46, and subsequently performs the adhesion processing on the plurality of sheets S being stacked. The plurality of sheets S (sheet bundle) subjected to the adhesion processing are discharged to a discharge tray 49 by a discharge roller pair 48.

Figure 2:
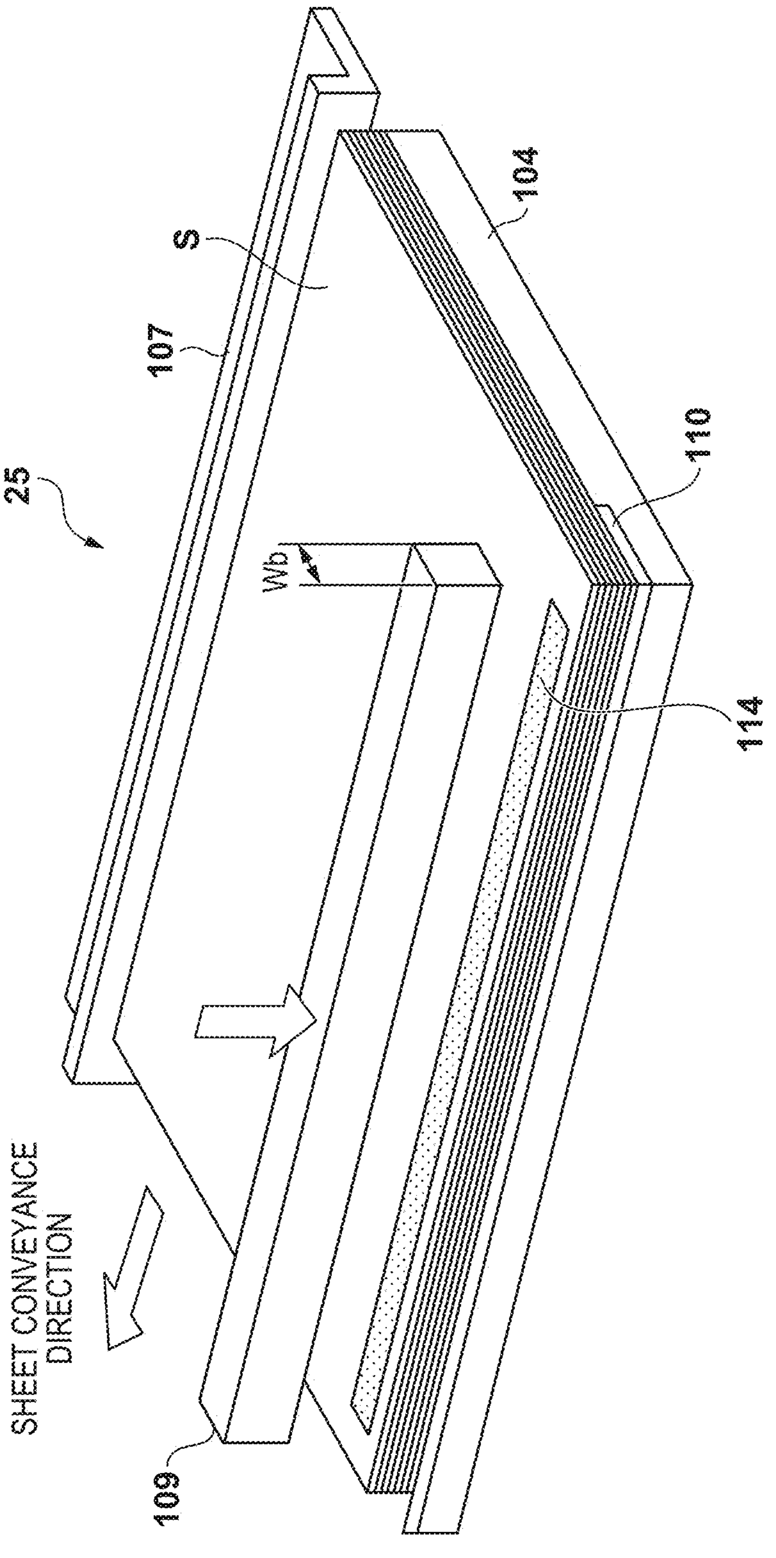
FIG. 2 is a schematic configuration diagram of a processing apparatus, according to some embodiments.

FIG. 2 is a configuration diagram of the processing apparatus 25. When the adhesion processing is performed, an adhesion image 114 is formed on both sides of the sheet S by a toner of black. In the present embodiment, the adhesion image 114 is an image of a rectangular shape with a long side being in the conveyance direction of the sheet, and is formed near one side of the sheet S, in which the side is parallel to the conveyance direction. In other words, the adhesion image 114 is provided in the vicinity of one of the edges in the width direction orthogonal to the conveyance direction of the sheet. The sheets S conveyed to the processing apparatus 25 are sequentially stacked on a stacking surface of a stacking tray 104. A pressing member 110 is provided on the stacking surface of the stacking tray 104. The region in which the pressing member 110 is provided includes a region on the sheet S where the adhesion image 114 is formed.

When the sheet S is conveyed onto the sheets S stacked on the stacking tray 104, an alignment plate 107 performs alignment processing of the sheets S stacked on the stacking tray 104. At this time, a heat-pressing member 109 including a built-in heater is waiting at a position separated from the sheets S in the normal direction of the sheets S stacked on the stacking tray 104. The heat-pressing member 109, having a same size as the adhesion image 114, or a size encompassing the adhesion image 114, is configured to contact the adhesion image 114 by moving in the normal direction of the sheet S. Here, the length of the heat-pressing member 109 in the width direction is Wb, as illustrated in FIG. 2. When the alignment processing is completed, the processing apparatus 25 moves the heat-pressing member 109 along the normal direction of the sheets S, and applies heat and pressure to the plurality of sheets S while nipping the sheets S by the heat-pressing member 109 and the pressing member 110. As a result, a toner of black forming the adhesion image 114 on each of the back surface of a newly stacked first sheet S and the front surface of a second sheet S directly below the first sheet S is melted and further pressed. And thus, the first sheet S and the second sheet S are adhered to each other. By performing the aforementioned operation at each time the sheet S is conveyed to the stacking tray 104, a plurality of sheets S is adhered into a sheet bundle.

Figure 3:
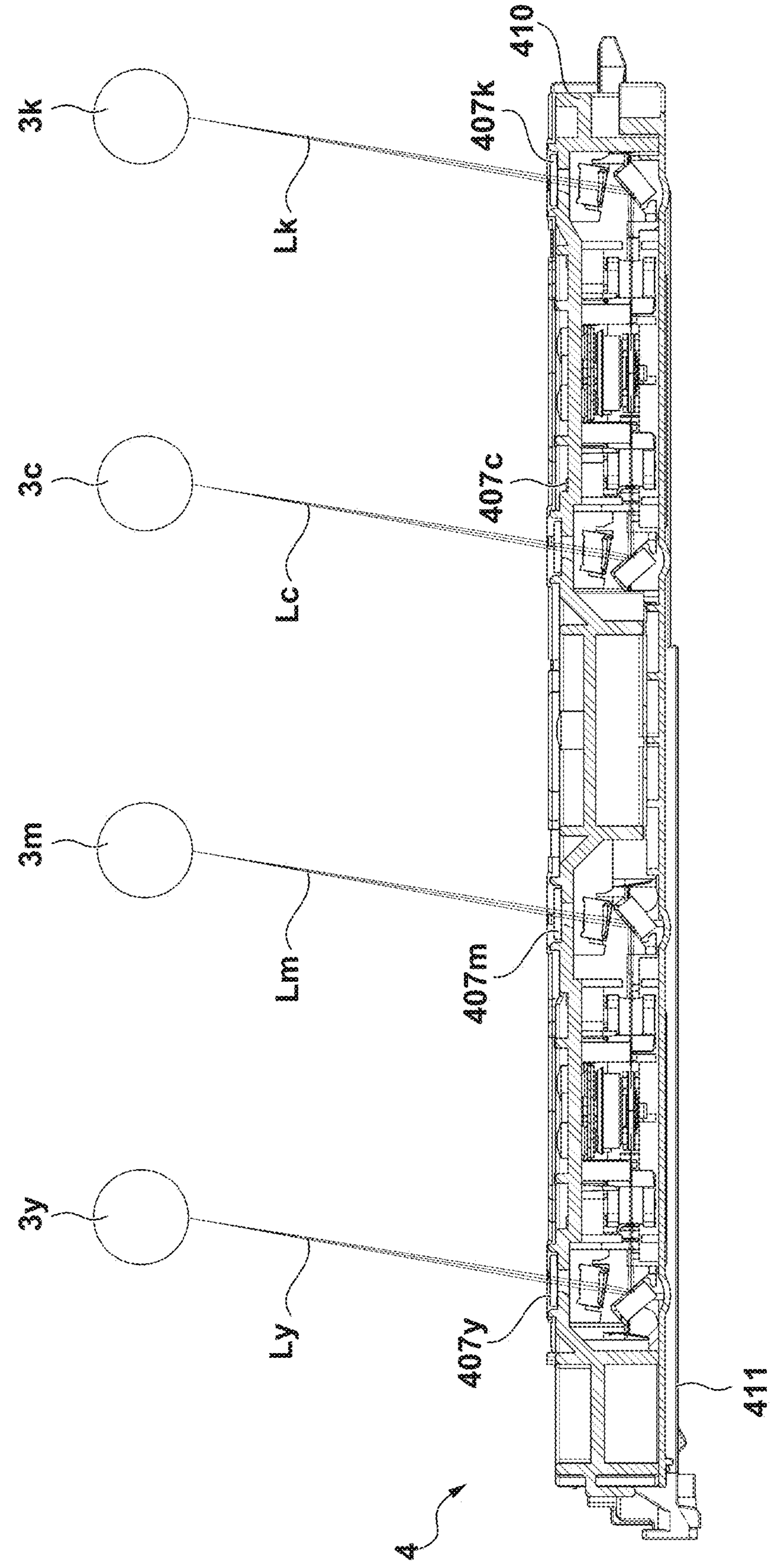
FIG. 3 is a cross-sectional diagram of a scanning apparatus, according to some embodiments.
Figure 4:
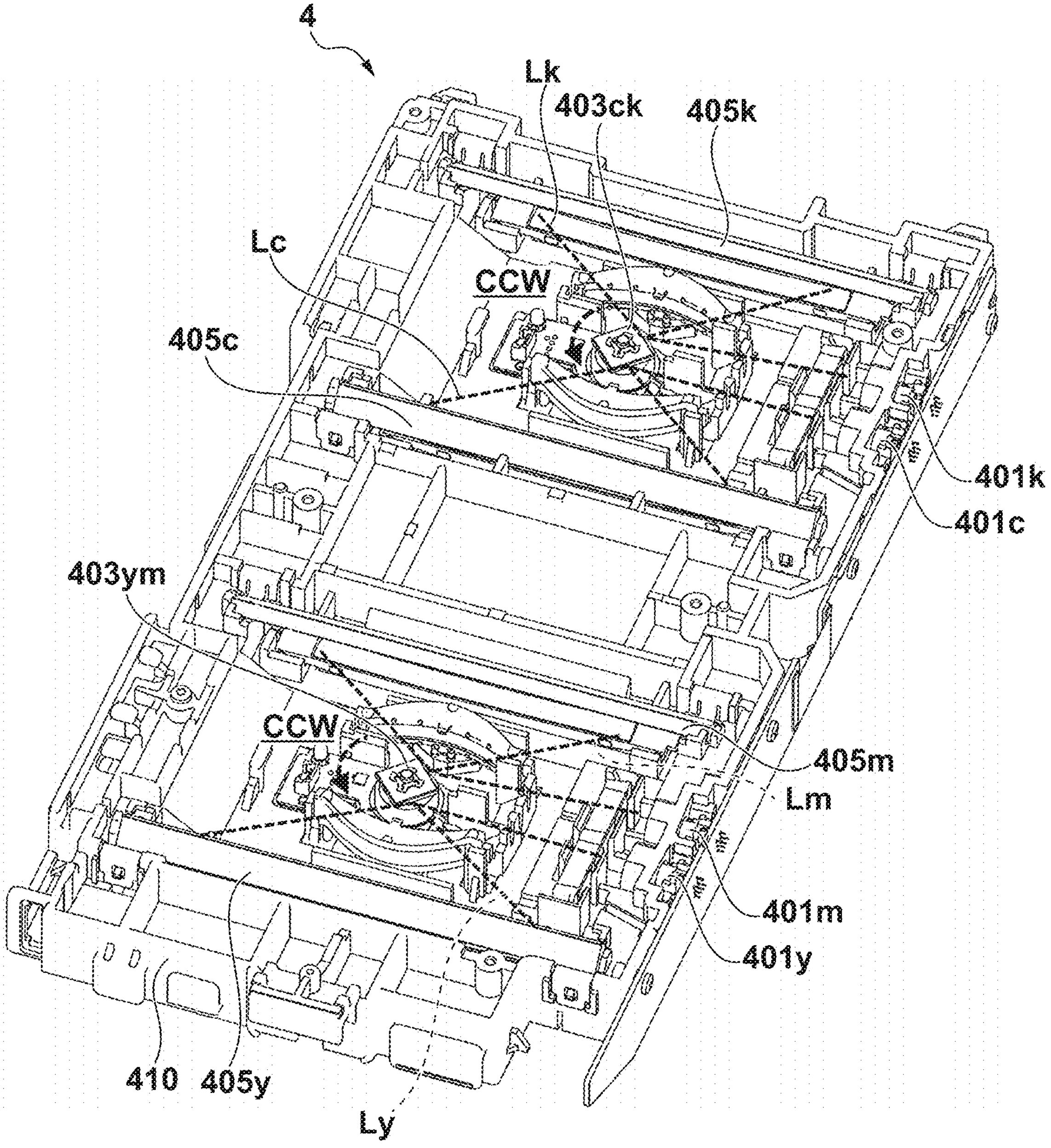
FIG. 4 is a perspective diagram of a scanning apparatus, according to some embodiments.

FIG. 3 and FIG. 4 are configuration diagrams of the scanning apparatus 4. Here, FIG. 3 is a cross-sectional view seen from the direction of the rotation axis of the photoreceptor 3. In addition, FIG. 4 is a perspective view of FIG. 3 seen from diagonally below in a state where the cover 411 illustrated in FIG. 3 is removed. As illustrated in FIG. 4, the scanning apparatus 4 includes light sources 401*y*, 401*m*, 401*c* and 401*k* which are semiconductor laser. The light sources 401*y*, 401*m*, 401*c* and 401*k* emit light beams Ly, Lm, Lc and Lk, respectively. A rotary polygon mirror 403*ym* reflects the light beams Ly and Lm toward a reflecting mirror 405*y* and a reflecting mirror 405*m*. The light beam Ly reflected by the reflecting mirror 405*y* forms a light spot on the photoreceptor 3*y* through glass 407*y* (FIG. 3). Similarly, the light beam Lm reflected by the reflecting mirror 405*m* forms a light spot on the photoreceptor 3*m* through the glass 407*m* (FIG. 3).

By rotating the rotary polygon mirror 403*ym* in the direction of an arrow CCW in the drawing, the spot of the light beam Ly and the spot of the light beam Lm respectively move along the rotation axis direction of the photoreceptor 3*y* and the photoreceptor 3*m*, thereby the photoreceptor 3*y* and the photoreceptor 3*m* are scanned. The trajectories of spots of the light beam Ly and the light beam Lm over the photoreceptor 3*y* and the photoreceptor 3*m* are referred to as scan lines. In addition, the movement directions of the spots of the light beam Ly and the light beam Lm on the photoreceptor 3*y* and the photoreceptor 3*m* are referred to as scanning directions. Here, the width direction orthogonal to the conveyance direction of the sheet S corresponds to the scanning direction. Latent images are formed on the photoreceptor 3*y* and the photoreceptor 3*m* by rotationally driving the photoreceptor 3*y* and the photoreceptor 3*m* and repeating the scanning with the spots of the light beam Ly and the light beam Lm. Here, one or more lenses are provided on the optical paths of the light beam Ly and the light beam Lm. In addition, as is apparent from the positional relationship in FIG. 4, the direction in which the spot of the light beam Ly moves across the photoreceptor 3*y* and the direction in which the spot of the light beam Lm moves across the photoreceptor 3*m*, i.e., the scanning directions of the light beam Ly and the light beam Lm are opposite each other. The same goes for the light beam Lc and the light beam Lk, and the description thereof will be omitted.

Figure 5:
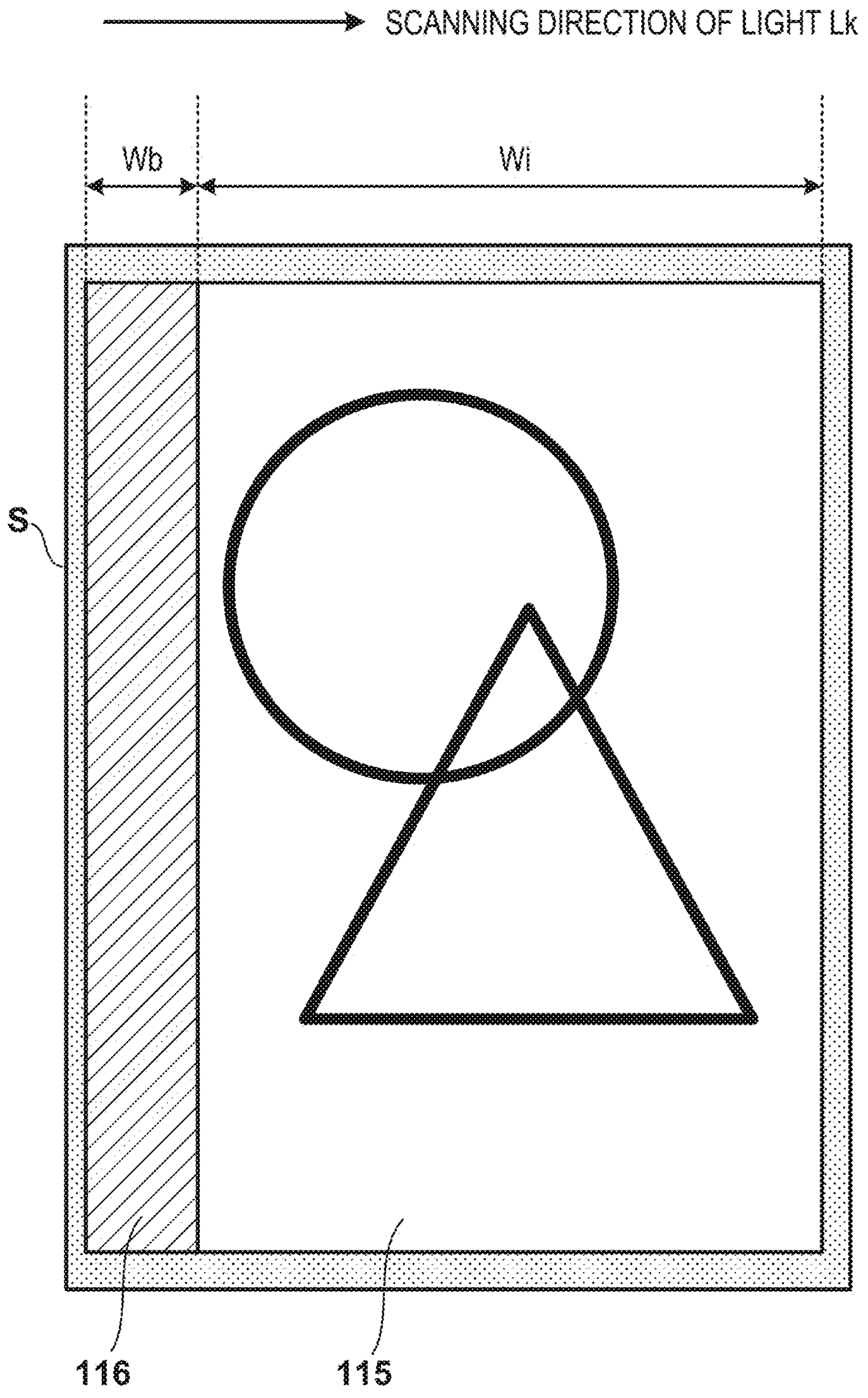
FIG. 5 is a diagram illustrating a scanning direction and each region of a sheet, according to some embodiments.

FIG. 5 is a diagram illustrating an image formed on the sheet S and a scanning direction of the light beam Lk. In FIG. 5, the scanning direction of the light beam Lk on the photoreceptor 3*k* is indicated by the corresponding direction on the sheet S. According to FIG. 5, the direction in which the light beam Lk scans the photoreceptor 3*k* corresponds to the direction from the left side to the right side of the sheet S in FIG. 5. In other words, the light beam Lk scans a region 116 of FIG. 5 in a single scan, and subsequently scans a region 115. Although not illustrated in FIG. 5, the scanning direction of the light beam Lm is same as that of the light beam Lk, and the scanning directions of the light beam Ly and the light beam Lc are opposite to that of the light beam Lk. A region of the sheet S on which an image can be formed (image forming enabled region) by the scanning apparatus 4 is divided into the region 116 and the region 115. The region 116 is set at one of the edges of the sheet S in the scanning direction. The region 116 is a region for forming the adhesion image 114 having a length in the scanning direction same with the length Wb of the heat-pressing member 109 in the width direction (corresponding to the scanning direction). The region 115 is a region for forming a user image. In the following description, the region 116 is referred to as "adhesion region 116", and the region 115 is referred to as "image region 115".

Figure 6:
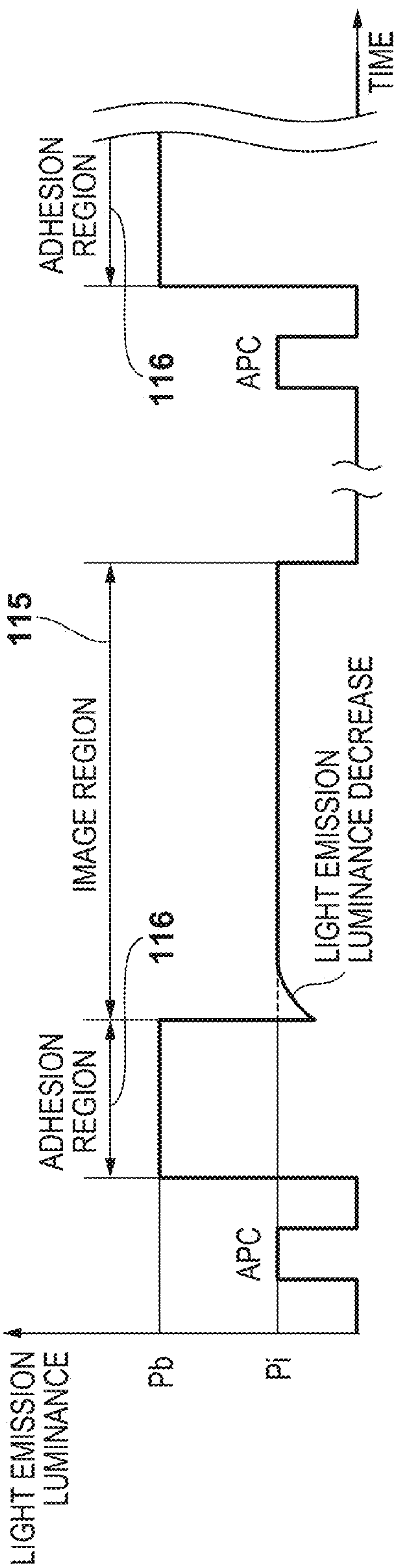
FIG. 6 is an explanatory diagram of a reason for occurrence of density unevenness in an image.

FIG. 6 is a diagram illustrating a temporal pattern (light emission pattern) of the light emission luminance (light emission intensity) of the light source 401*k* when the photoreceptor 3*k* is scanned with the light beam Lk. In FIG. 6, a light emission luminance Pi is a light emission luminance in scanning the image region 115, and the light emission luminance Pi is determined by image forming condition. Additionally, in FIG. 6, a light emission luminance Pb is a light emission luminance in scanning the adhesion region 116. The adhesion force can be secured by increasing the light emission luminance Pb to be higher than the light emission luminance Pi and increasing the amount of applied toner to the adhesion image 114. Here, for example, the adhesion image 114 is formed as a solid image having the same size as the adhesion region 116 in order to secure the adhesion force.

First, before the scanning of a single scan line on the adhesion region 116 is started, the control unit 80 performs Automatic Power Control (APC) to adjust the light emission luminance of the light source 401*k* to Pi. APC determines a reference current value of a drive current supplied to the light source 401*k* to make the light emission luminance of the light source 401*k* to be Pi. At the start timing of the scanning on the adhesion region 116, the control unit 80 sets the current value of the drive current supplied to the light source 401*k* to an increased current value which is larger than the reference current value, in order to change the light emission luminance of the light source 401*k* to Pb. Subsequently, the control unit 80 sets the current value of the drive current supplied to the light source 401*k* to the reference current value, in order to change the light emission luminance of the light source 401*k* to Pi at the start timing of scanning on the image region 115.

In order to form the adhesion image 114, the control unit 80 controls the scanning apparatus 4 to emit light at the light emission luminance Pb which is higher than the light emission luminance Pi, during the adhesion region 116 being scanned. Therefore, the temperature of the light source 401*k* rises during the adhesion region 116 being scanned, whereby the light emission efficiency of the light source 401*k* may be decreased. If the light emission efficiency of the light source 401*k* is decreased at the start of the scanning on the image region 115, the light emission luminance of the light source 401*k* becomes lower than the target luminance Pi, even when the drive current of reference current value is supplied to the light source 401*k*. The decrease in the light emission luminance continues until the emission efficiency recovers to the original level owing to the decrease in the temperature of the light source 401*k*. The density of the image based on the latent image, which is formed while the light emission luminance is decreased, is lower than that formed with the light emission luminance Pi. Therefore, the density of the user image in a certain part of the image region 115 at the side contacting the adhesion region 116 decreases, which may cause density unevenness in the user image. If the adhesion region 116 is also scanned with the light emission luminance Pi in order to suppress density unevenness of the user image, the desired adhesion force may not be secured.

Figure 7A:
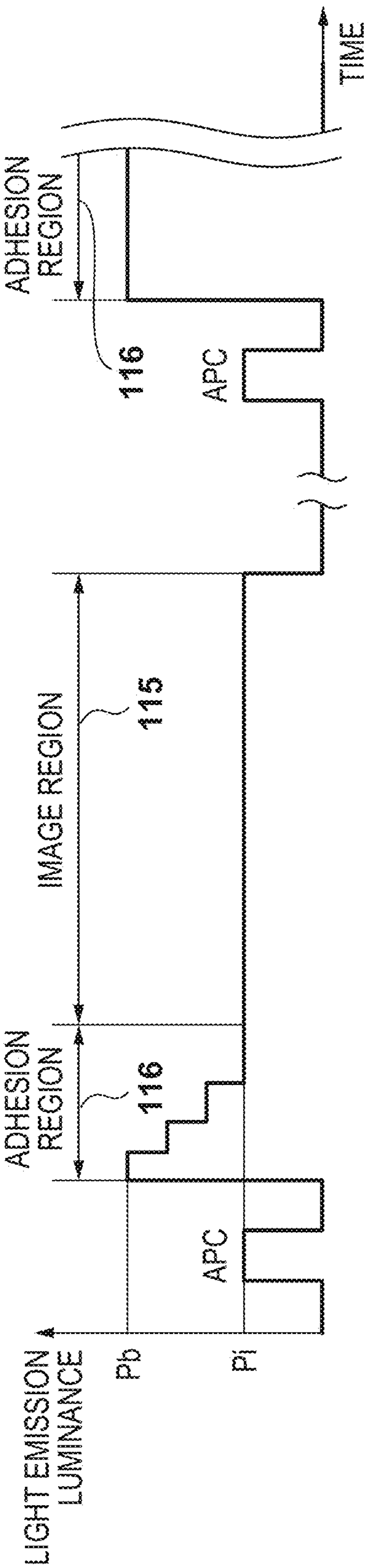
FIG. 7A to FIG. 7C are diagrams illustrating temporal patterns of light emission luminance of the scanning apparatus, according to some embodiments.
Figure 7B:
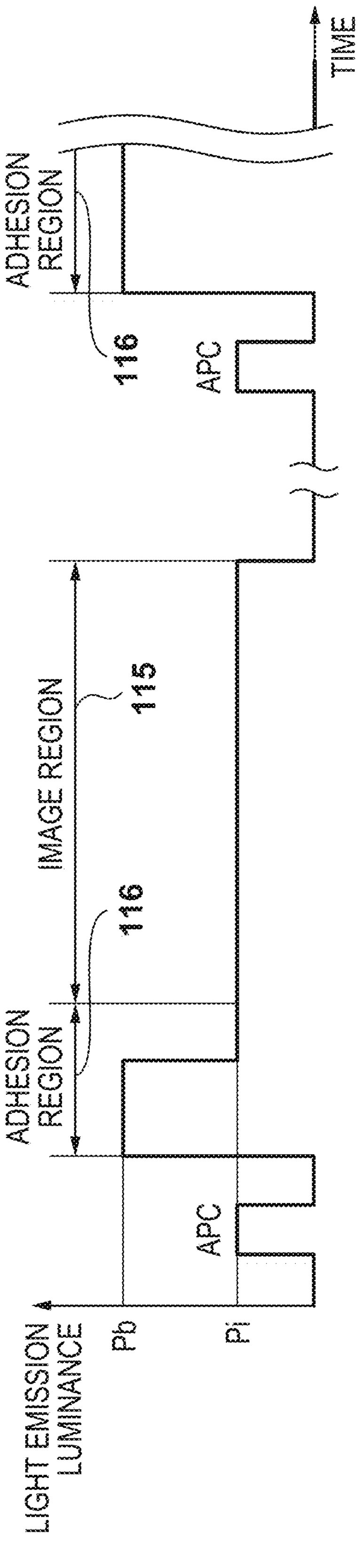
Figure 7C:
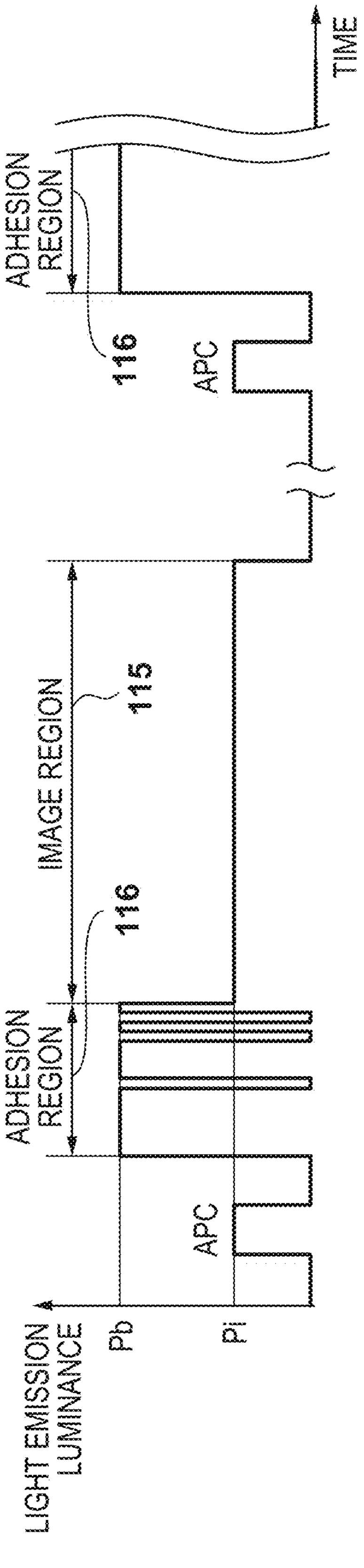

Therefore, in the present embodiment, the adhesion region 116 is scanned in a manner as illustrated in any of FIG. 7A to FIG. 7C. In the following description, the upstream side and the downstream side of the scanning direction of the light beam Lk are simply referred to as "upstream side" and "downstream side", respectively. In FIG. 7A, the light emission luminance is gradually decreased in the adhesion region 116. Specifically, the light emission luminance at the start of scanning on the adhesion region 116 is Pb that is same as FIG. 6. The light emission luminance is then decreased in a stepwise manner such that the light emission luminance at the end of scanning on the adhesion region 116 becomes the light emission luminance Pi that is used in scanning the image region 115. Alternatively, it may be configured such that the light emission luminance is continuously decreased instead of decreasing in a stepwise manner. In addition, the position in the adhesion region 116 at which the light emission luminance is set to Pi may be a position on the boundary with the image region 115, or a position at the upstream side relative to the position on the boundary. By decreasing the light emission luminance toward Pi during the scanning on the adhesion region 116, a temperature rise of the light source 401*k* can be suppressed. Therefore, it is possible to suppress occurrence of density unevenness due to the light emission luminance being decreased below Pi at the start of the scanning on the image region 115.

In FIG. 7B, the adhesion region 116 is first scanned at the light emission luminance Pb and subsequently the light emission luminance is lowered to Pi at a position at the upstream side relative to the boundary with the image region 115. In FIG. 7A, another light emission luminance which is higher than Pi and lower than Pb is used in the adhesion region 116, in addition to the light emission luminance Pi and the light emission luminance Pb. In other words, in FIG. 7A, three or more types of light emission luminance are used in the adhesion region 116, including the light emission luminance Pb and the light emission luminance Pi. In FIG. 7B, two types of the light emission luminance that are Pb and Pi are used in the adhesion region 116. By decreasing the light emission luminance to Pi while the adhesion region 116 is scanned, a temperature rise of the light source 401*k* can be suppressed. Therefore, it is possible to suppress occurrence of density unevenness due to the light emission luminance being decreased below Pi at the start of the scanning on the image region 115. In the configuration illustrated in FIG. 7A, three or more types of light emission luminance are used in the adhesion region 116, and therefore the scanning apparatus 4 requires a current value control circuit that can output three or more current values. On the other hand, in a configuration of FIG. 7B, it is sufficient to use a current value control circuit that can output two current values, and thus the configuration of the scanning apparatus 4 can be simplified.

Note that, in the configurations of FIG. 7A and FIG. 7B, as long as the required adhesion force can be secured, the light emission luminance of the light source 401*k* may be set to zero in a predetermined range from a predetermined position in the adhesion region 116 to a position contacting the image region 115. In other words, it may be configured such that the adhesion image 114 having a width Wc in the scanning direction, which is smaller than the width Wb, is formed, instead of forming the adhesion image 114 having the width Wb in the scanning direction. The adhesion image 114 is provided in a range of a distance Wc from the most upstream side of the adhesion region 116 along the scanning direction. In this case, no latent image is formed in the range of (Wb-Wc) on the most downstream side of the adhesion region 116. The control unit 80 can set the light emission luminance of the light source 401*k* to zero by controlling the drive current output from the current value control circuit to be zero. Alternatively, instead of setting the current value of the drive current output by the current value control circuit to zero, the control unit 80 can set the light emission luminance of the light source 401*k* to zero by switching, using a switch or the like, the path of the drive current from the light source 401*k* to a dummy resistor, for example. In the latter case, the control unit 80 does not need to change the setting value of the current value control circuit in order to set the light emission luminance of the light source 401*k* to zero.

In FIG. 7C, the light emission luminance is switched between Pb and 0 in the adhesion region 116. For example, the control unit 80 can switch the light emission luminance between Pb and 0 by turning on and off, using a switch or the like, the drive current flowing toward the light source 401*k*, with keeping the value of the drive current supplied to the light source 401*k* at the increased current value. Here, the switching frequency are increased toward the downstream side of the adhesion region 116. In other words, in FIG. 7C, instead of a solid image, the adhesion image 114 is formed as a halftone image in which the density decreases toward the downstream side of the adhesion region 116. The frequency of setting the light emission luminance to zero increases as the scanning approaches the downstream side of the adhesion region 116, whereby a temperature rise of the light source 401*k* can be suppressed. Therefore, it is possible to suppress occurrence of density unevenness due to the light emission luminance being decreased below Pi at the start of the scanning on the image region 115.

In the configuration illustrated in FIG. 7A to FIG. 7C, the amount of applied toner at the downstream side of the adhesion region 116 becomes smaller than at the upstream side, and thus an adhesion force decreases than that of the configuration of FIG. 6. Therefore, the light emission pattern in the adhesion region 116 is determined to secure the required adhesion force.

As has been described above, by adjusting the exposure pattern for the adhesion image 114, i.e., the light emission pattern of the scanning apparatus 4 for forming the adhesion image 114, decrease in the light emission luminance at the starting of the formation of the user image can be suppressed. By the aforementioned configuration, density unevenness in the user image can be suppressed while the adhesion force is secured.

Second Embodiment

Next, a second embodiment will be described focusing on differences from the first embodiment. In the first embodiment, the adhesion region 116 is set in an image forming enabled region in which the scanning apparatus 4 can form an image, and the remaining region in the image forming enabled region is set as the image region 115, as illustrated in FIG. 6. In the present embodiment, the image region 115 is determined based on the image data, without setting the entire region of the image forming enabled region excluding the adhesion region 116 as the image region 115.

Figure 8:
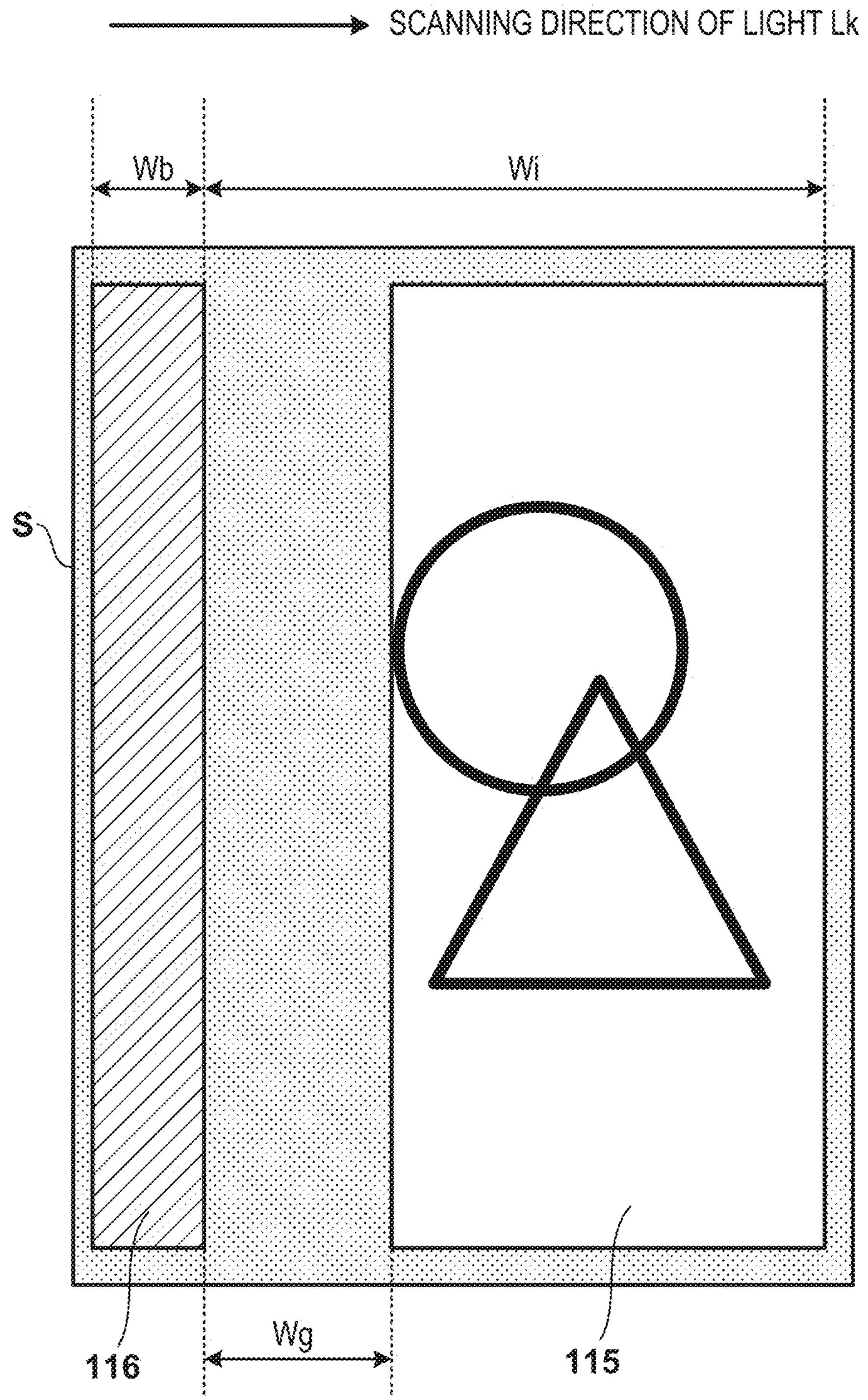
FIG. 8 is a diagram illustrating a scanning direction and each region of a sheet, according to some embodiments.

FIG. 8 is a diagram illustrating an example of the image region 115 determined based on the image data. In FIG. 8, there exists a gap region (non-image region) in which no image is formed between the adhesion region 116 and the image region 115. According to FIG. 8, the length of the gap region in the scanning direction is Wg. In the gap region, the light emission luminance of the light source 401*k* is set to zero, i.e., the light source 401*k* is set to a lighting-off state. Therefore, although the temperature of the light source 401*k* rises due to the scanning on the adhesion region 116, the temperature of the light source 401*k* may decrease to a level at which the light emission efficiency will recover, until the scanning on the image region 115 starts. In this case, although the light emission luminance Pb is set in the entire adhesion region 116 as illustrated in FIG. 9, the density unevenness of the user image formed in the image region 115 does not occur.

Figure 9:
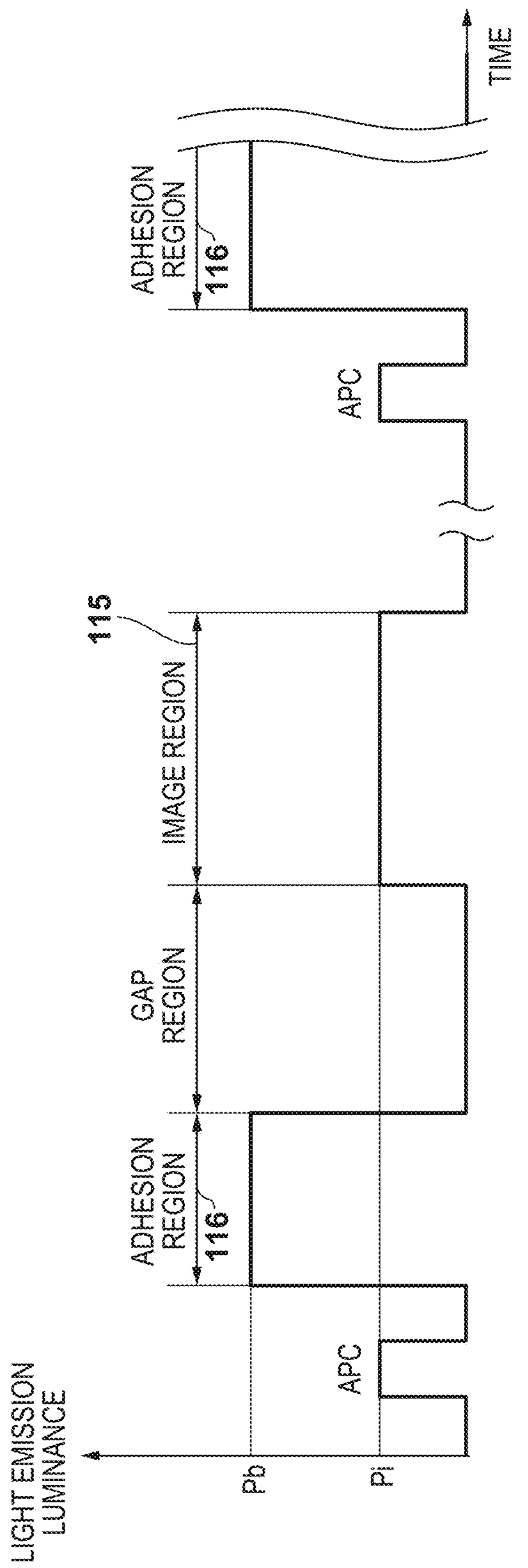
FIG. 9 is a diagram illustrating a temporal pattern of light emission luminance of the scanning apparatus, according to some embodiments.

In the present embodiment, the exposure as illustrated in FIG. 9 and the exposure as described in the first embodiment are switched based on the length Wg of the gap region in the scanning direction. The control unit 80 determines the image region 115 based on the image data, and determines the length Wg in the scanning direction between the predetermined adhesion region 116 and the image region 115 being determined. When the length Wg being determined is larger than a predetermined value, the control unit 80 performs the exposure as illustrated in FIG. 9, otherwise performs the exposure as described in the first embodiment.

Here, the control unit 80 can determine the image region 115 based on the entire user image formed on the sheet S, or divide the sheet S into a plurality of segments in a direction orthogonal to the scanning direction of the light beam Lk and determine the image region 115 for each segment. FIG. 8 is a diagram illustrating an example in which the image region 115 is determined based on the entire user image formed on the sheet S. In this case, the control unit 80 determines, based on the image data, an image position on the most upstream side where the user image is formed, and defines Wg to be the length in the scanning direction between the image position or a position based on the image position and a position at the most downstream side of the adhesion region 116. In determining the image region 115 for each segment, the control unit 80 determines, based on the image data, the image position at the most upstream side where the user image is formed among the plurality of scan lines included in the segment. In this case, the control unit 80 determines whether to perform the exposure for each segment as illustrated in FIG. 9, or to perform the exposure as described in the first embodiment. Here, the number of scan lines included in a segment may be “1”. In such a case, the control unit 80 determines the length Wg of the gap region for each scan line, and determines, for each scan line, whether to perform the exposure as illustrated in FIG. 9, or to perform the exposure as described in the first embodiment. In other words, the control unit 80 can determine the image region 115 for each scan line, or for each group of a plurality of scan lines being consecutive in a direction orthogonal to the scanning direction. When there is a plurality of groups, each group corresponds to the aforementioned segment. The case where there is only one group corresponds to determining the image region 115 across the entire sheet S.

As has been described above, in the present embodiment, the light emission luminance is maintained at Pb during the scanning on the adhesion region 116, depending on the value of the gap region Wg. Therefore, it is possible to make an adhesion force to be higher than that in the first embodiment, depending on the user image, while the density unevenness of the user image is suppressed.

Third Embodiment

Figure 10:
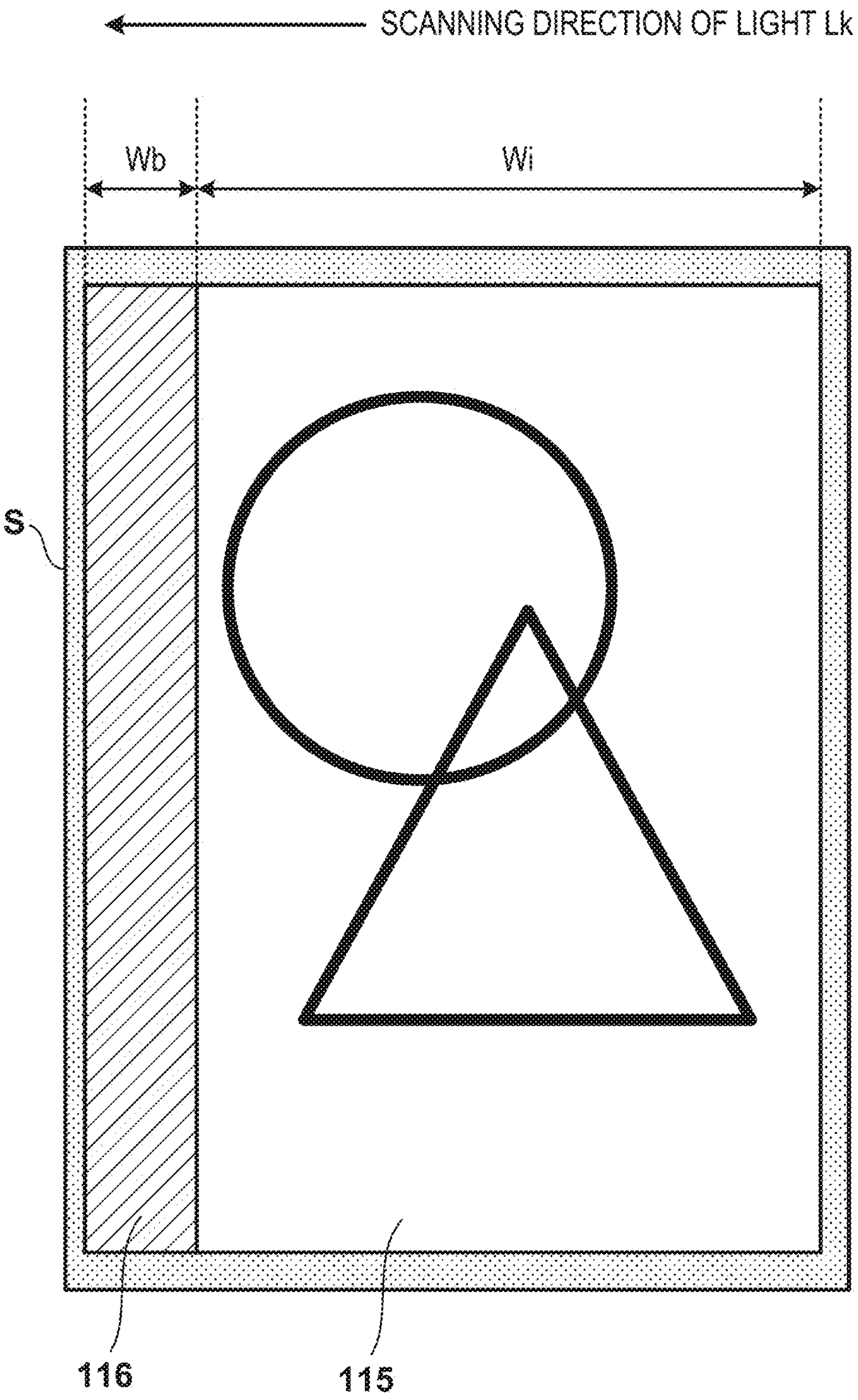
FIG. 10 is a diagram illustrating a scanning direction and each region of a sheet, according to some embodiments.

Next, a third embodiment will be described focusing on differences from the first embodiment and the second embodiment. The rotational directions of the rotary polygon mirrors 403_ym_ and 403_ck_ in the image forming apparatus 1S of the present embodiment are opposite to those in the first embodiment. Therefore, the scanning direction of the light beam Lk is also opposite to that in the first embodiment, as illustrated in FIG. 10. In other words, although the adhesion region 116 is located at the upstream side of the image region 115 in the first and the second embodiments, the adhesion region 116 in the present embodiment is located at the downstream side of the image region 115.

Figure 11:
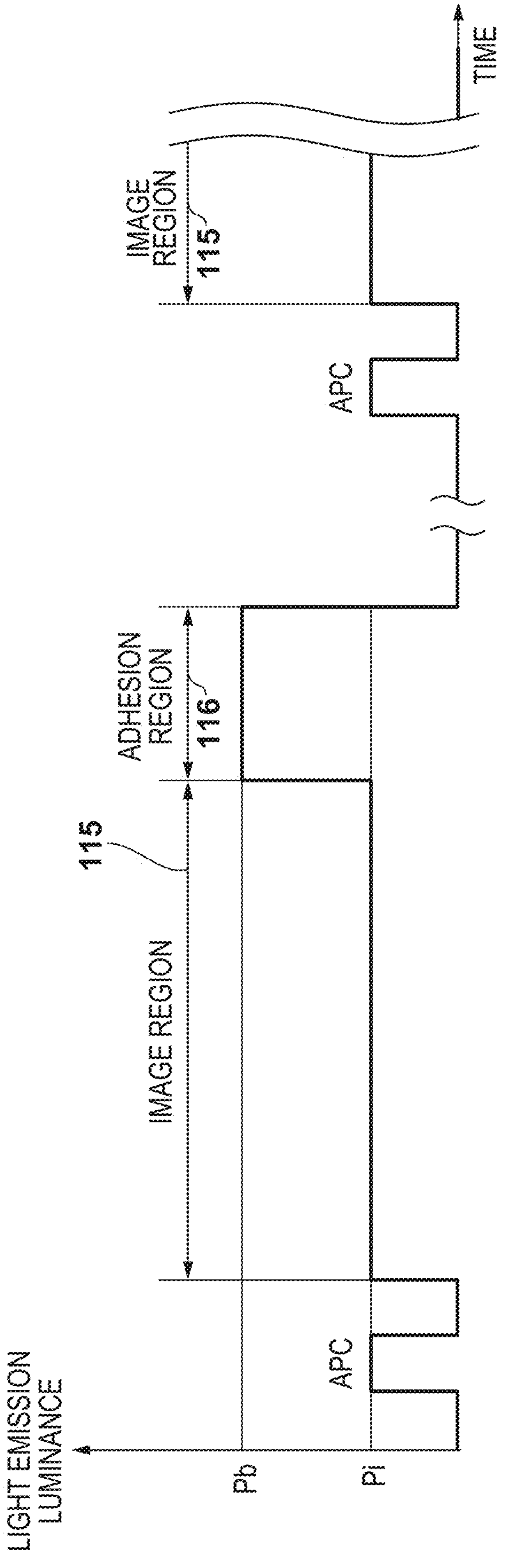
FIG. 11 is a diagram illustrating a temporal pattern of light emission luminance of a scanning apparatus, according to some embodiments.

In the present embodiment, therefore, the image region 115 is scanned first, and the scanning of the adhesion region 116 is started after the scanning of the image region 115 is completed, as illustrated in FIG. 11. Light emission luminance adjustment of the light source 401_k_ is performed by APC until the scanning of the image region 115 is started next after the scanning of the adhesion region 116 is completed. But while the APC is not performed, the light source 401_k_ is lighting-off. Accordingly, even if the light emission luminance is set to Pb in the entire adhesion region 116 and the temperature of the light source 401_k_ rises, the temperature of the light source 401_k_ decreases until the next scanning of the image region 115 is started, whereby occurrence of density unevenness in the user image can be prevented.

As such, when the adhesion region 116 is located at the downstream side of the image region 115, the control unit 80 scans the entire adhesion region 116 with the light emission luminance Pb. By the aforementioned configuration, occurrence of density unevenness in the user image can be prevented while the adhesion force is secured. For example, although a toner of black is used as an adhesive in a fixed manner in the present embodiment, it may be configured such that the toner to be used as the adhesive may be dynamically selected based on the remaining amount of the toner or the like. In this case, the control unit 80 can determine whether to perform the exposure as in the present embodiment, or to perform the exposure as in the first and the second embodiment, based on the scanning direction of the photoreceptor 3 subjected to development with the toner used as the adhesive.

The aforementioned embodiments have been described based on a color image forming apparatus configured to form an image using toners of a plurality of colors. However, each of the aforementioned embodiments can also be applied to, for example, a monochrome image forming apparatus configured to form an image using only toner of black.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080365, filed May 15, 2023, which is hereby incorporated by reference herein in its entirety.

What is claimed is:

1. An image forming apparatus configured to form an image on a sheet, comprising:

- a scanning unit configured to, by scanning a photoreceptor with light in a scanning direction, form a first latent image based on image data in a first region of the photoreceptor, and form, in a second region of the photoreceptor which is different from the first region in the scanning direction, a second latent image for adhesion processing for the sheet;
- a developing unit configured to develop the first latent image and the second latent image with toner; and
- a control unit configured to control a light emission luminance of the scanning unit; wherein
- the control unit is further configured to set the light emission luminance of the scanning unit to a first light emission luminance when scanning of the first region is started, and set the light emission luminance of the scanning unit to a second light emission luminance which is higher than the first light emission luminance when scanning of the second region is started, and
- the control unit is further configured to decrease the light emission luminance of the scanning unit from the second light emission luminance while the second region is being scanned, in a case where the second region is located at an upstream side of the first region in the scanning direction.

2. The image forming apparatus according to claim 1, wherein the control unit is further configured to decrease the light emission luminance of the scanning unit from the second light emission luminance continuously or in a stepwise manner toward the first light emission luminance while the second region is being scanned, in a case where the second region is located at an upstream side of the first region in the scanning direction.

3. The image forming apparatus according to claim 2, wherein the control unit is further configured to set the light emission luminance of the scanning unit to the first light emission luminance before the scanning of the second region is completed, in a case where the second region is located at an upstream side of the first region in the scanning direction.

4. The image forming apparatus according to claim 1, wherein the control unit is further configured to change the light emission luminance of the scanning unit from the second light emission luminance to the first light emission luminance before the scanning of the second region is completed, in a case where the second region is located at an upstream side of the first region in the scanning direction.

5. The image forming apparatus according to claim 1, wherein the control unit is further configured to make the scanning unit to be lighting-off from a predetermined position of the second region to a position at a most downstream side of the second region in the scanning direction, in a case where the second region is located on the upstream side of the first region in the scanning direction.

6. The image forming apparatus according to claim 1, wherein the control unit is configured to switch the light emission luminance of the scanning unit between the second light emission luminance and zero while the second region is being scanned, and increases the frequency of switching the light emission luminance of the scanning unit between the second light emission luminance and zero as the scanning approaches a downstream side of the second region, in a case where the second region is located at an upstream side of the first region in the scanning direction.

7. The image forming apparatus according to claim 1, wherein the control unit sets the light emission luminance of the scanning unit to the second light emission luminance while the second region is being scanned, in a case where the second region is located at a downstream side of the first region in the scanning direction.

8. The image forming apparatus according to claim 1, further comprising:

a transfer unit configured to transfer, to a sheet, a first image and a second image formed on the photoreceptor by the developing unit developing the first latent image and the second latent image with the toner;

a fixing unit configured to apply heat and pressure to the sheet, and fix, to the sheet, the first image and the second image which have been transferred to the sheet; and a processing unit configured to stack a plurality of the sheets on which the first image and the second image are fixed, and perform the adhesion processing by applying heat and pressure to the second region of the plurality of the sheets.

9. The image forming apparatus according to claim 1, wherein the second region is a predetermined region, and the first region is a region excluding the second region from the region in which a latent image can be formed by the scanning unit on the photoreceptor.

10. The image forming apparatus according to claim 1, wherein the second region is a predetermined region, the control unit determines the first region based on the image data, and the control unit is further configured to decrease the light emission luminance of the scanning unit from the second light emission luminance while the second region is being scanned, in a case where the second region is located at an upstream side of the first region in the scanning direction and a length between the second region and the first region in the scanning direction is shorter than a predetermined value.

11. The image forming apparatus according to claim 10, wherein the control unit sets the light emission luminance of the scanning unit to the second light emission luminance while the second region is being scanned, in a case where the length between the second region and the first region in the scanning direction is not shorter than the predetermined value.

12. The image forming apparatus according to claim 10, wherein the control unit is further configured to determine the first region for each scan line, or determine the first region for each group of a plurality of scan lines being consecutive in a direction orthogonal to the scanning direction.

* * * * *